United States Patent [19]

Ukihashi et al.

[11] 4,126,588
[45] Nov. 21, 1978

[54] FLUORINATED CATION EXCHANGE MEMBRANE AND USE THEREOF IN ELECTROLYSIS OF ALKALI METAL HALIDE

[75] Inventors: Hiroshi Ukihashi, Tokyo; Tatsuro Asawa, Yokohama; Masaaki Yamabe, Machida; Tomoki Gunjima, Yokohama; Haruhisa Miyake, Yokohama, all of Japan

[73] Assignee: Asahi Glass Company Ltd., Tokyo, Japan

[21] Appl. No.: 755,068

[22] Filed: Dec. 28, 1976

[30] Foreign Application Priority Data

Dec. 30, 1975 [JP] Japan .............................. 50/157302
Mar. 29, 1976 [JP] Japan .............................. 51/33486

[51] Int. Cl.² .............................................. C25B 1/10
[52] U.S. Cl. ...................................... 521/31; 204/296
[58] Field of Search ............ 260/2.2 R; 526/14, 247, 526/242, 245

[56] References Cited

U.S. PATENT DOCUMENTS

| 3,546,186 | 12/1970 | Gladding | 526/245 |
|---|---|---|---|
| 3,635,926 | 1/1972 | Greehan et al. | 526/247 |
| 3,642,792 | 2/1972 | Carlson | 526/247 |
| 3,960,697 | 6/1976 | Kircher et al. | 204/252 |

Primary Examiner—Joseph L. Schofer
Assistant Examiner—Peter F. Kulkosky
Attorney, Agent, or Firm—Oblon, Fisher, Spivak, McClelland & Maier

[57] ABSTRACT

A fluorinated cation exchange membrane is made of three component copolymer produced by copolymerizing a fluorovinylpolyether having the formula I $$CF_2=CF-O-CF_2-(CFXOCF_2)_\alpha-(CFX')_\beta-(CF_2OCFX'')_\gamma-A$$

wherein $\alpha$ is 0 to 3; $\beta$ is 0 to 6; $\gamma$ is 0 to 4 and either $\alpha$ or $\gamma$ is not 0; X, X' and X'' respectively represent —F or a $C_{1-5}$ perfluoroalkyl group; A represents —CN—, —COF, —COOH, —COOR$_1$, —COOM or —CONR$_2$R$_3$; R$_1$ represents a $C_{1-10}$ alkyl group preferably a $C_{1-3}$ alkyl group, R$_2$ and R$_3$ respectively represents hydrogen atom or a $C_{1-10}$ alkyl group; and M represents an alkali metal atom or a quaternary ammonium group, a fluorovinyl compound having the formula II $$CF_2=CF-(O)_\delta-(CFY)_\gamma-A'$$

wherein $\delta$ is 0 to 1; $\gamma$ is 1 to 6; Y represents —F or a $C_{1-5}$ perfluoroalkyl group; A is defined in the formula I and a fluorinated olefin having the formula III $$CF_2=CZZ'$$

wherein Z and Z' respectively represent —H, —Cl, —F or —CF$_3$, and if necessary hydrolyzing the copolymer.

13 Claims, No Drawings

FLUORINATED CATION EXCHANGE MEMBRANE AND USE THEREOF IN ELECTROLYSIS OF ALKALI METAL HALIDE

BACKGROUND OF THE INVENTION

1. Field of the Invention

The present invention relates to a novel fluorinated cation exchange membrane. More particularly, it relates to a fluorinated cation exchange membrane having an ion exchangeable group which is effectively usable for diaphragm electrolysis of an aqueous solution of electrolytes such as an alkali metal chloride.

2. Description of the Prior Art

It has been known to produce alkali metal hydroxide in a cathode compartment and chlorine in an anode compartment by partitioning the anode compartment and the cathode compartment and electrolyzing an aqueous solution of alkali metal chloride fed therein. The method has been known as a diaphragm electrolysis in two compartments. Heretofore, an asbestos diaphragm has been usually used in the method. When the asbestos diaphragm is used, the asbestos itself is corroded by the electrolyte. Accordingly, the asbestos diaphragm disadvantageously has a short lifetime.

In this method, the diaphragm has fine pores which pass the electrolyte whereby alkali metal chloride is incorporated in the resulting alkali metal hydroxide to cause low purity. Furthermore, when the concentration of alkali metal hydroxide is increased, the current efficiency is disadvantageously decreased.

In order to prolong the life of the diaphragm and to use it over a long time period, it has been proposed to coat the asbestos diaphragm with an alkali resistant fluorinated resin having a hydrophilic group or to form a diaphragm made of the alkali resistant fluorinated resin having the hydrophilic group (U.S. Pat. Nos. 3,853,720; 3,853,721). The diaphragm used in the latter method is also porous thereby passing the electrolyte. Accordingly, the purity of the alkali metal hydroxide obtained is relatively low. When the concentration of the alkali metal hydroxide is increased, it is difficult to prevent the current efficiency from decreasing. It has also been proposed to use a cation exchange membrane which does not substantially pass the electrolyte and selectively passes alkali metal ions as the diaphragm. It has been especially proposed to use a fluorinated cation exchange membrane having high alkali resistance and chlorine resistance (U.S. Pat. Nos. 3,773,634; 3,852,135). When such a cation exchange membrane is used as the diaphragm, the electrolyte is not substantially passed through it but only alkali metal ions are selectively passed through it, whereby the contamination of the alkali metal chloride in the resulting alkali metal hydroxide can be prevented to obtain a product having a satisfactory purity. However, there does not exist a cation exchange membrane having satisfactory current efficiency. Even the best known cation exchange membranes such as one made of a copolymer of $C_2F_4$ and $CF_2=CFOCF_2CF(CF_3)OCF_2CF_2SO_2F$ can not attain a current efficiency higher than 85% in a concentration of sodium hydroxide of higher than 20%, though the current efficiency may be higher when the concentration of sodium hydroxide is low.

SUMMARY OF THE INVENTION

An object of the present invention is to provide a fluorinated cation exchange membrane which can be used as a diaphragm for producing a high purity alkali metal hydroxide in high concentration with high current efficiency in the diaphragm electrolysis of an alkali metal chloride.

Another object of the present invention is to provide a process and apparatus for electrolyzing an alkali metal halide by using the fluorinated cation exchange membrane.

These objects of the present invention have been attained by providing a fluorinated cation exchange membrane which is made of a three component copolymer produced by copolymerizing a fluorovinylpolyether having the formula I

wherein $\alpha$ is 0 to 3; $\beta$ is 0 to 6; $\gamma$ is 0 to 4 and either $\alpha$ or $\gamma$ is not 0; X, X' and X" respectively represent —F or a $C_{1-5}$ perfluoroalkyl group; A represents —CN—, —COF, —COOH, —COOR$_1$, —COOM or —CONR$_2$R$_3$; R$_1$ represents a $C_{1-10}$ alkyl group preferably a $C_{1-3}$ alkyl group; R$_2$ and R$_3$ respectively represents hydrogen atom or a $C_{1-10}$ alkyl group; and M represents an alkali metal atom or a quaternary ammonium group, a fluorovinyl compound having the formula II

wherein $\delta$ is 0 to 1; $\gamma$ is 1 to 6; Y represents —F or a $C_{1-5}$ perfluoroalkyl group; A is defined in the formula I and a fluorinated olefin having the formula III

wherein Z and Z' respectively represent —H, —Cl, —F or —CF$_3$, and if necessary hydrolyzing the copolymer. The copolymer has pendant side chains having an ion exchange group such as —COOH.

The fluorinated cation exchange membrane having an ion exchange capacity of 0.5 to 2.0 meq/g dry polymer is used as a diaphragm in a diaphragm electrolysis of an aqueous solution of electrolyte such as alkali metal chloride to produce an alkali metal hydroxide and chlorine whereby excellent electrolytic characteristics and excellent stability for maintaining mechanical properties for a long time can be attained.

DETAILED DESCRIPTION OF THE PREFERRED EMBODIMENTS:

These excellent characteristics of the cation exchange membrane of the invention can be attained by using the three component copolymer produced from three types of the fluorovinyl compounds.

The characteristics of the membranes of the invention could not be attained by a cation exchange membrane made of a copolymer produced from two component types of the fluorovinyl compounds which are the same with them.

For example, a cation exchange membrane made of a copolymer of the fluorovinyl polyether (I) and the fluorinated olefin (III) has excellent flexibility however, it is difficult to obtain the copolymer having high molecular weight because of relatively low reactivity of the fluorovinyl polyether (I). Accordingly, the temperature for volumetric melt flow rate of 100 mm$^3$/second which relates to the molecular weight of the copolymer is low and the mechanical properties of the membrane are not always satisfactory.

When the ratio of the fluorovinyl polyether (I) in the copolymer is lowered, the temperature for volumetric melt flow rate of 100 mm³/second becomes high enough to improve the mechanical properties. However, the ion exchange capacity of the resulting cation exchange membrane is not enough high whereby the electrical properties are inferior.

On the other hand, a cation exchange membrane made of a copolymer of the fluorovinyl compound (II) and the fluorinated olefin (III) can have high temperature for volumetric melt flow rate of 100 mm³/second because of the relatively high reactivity of the fluorovinyl compound (II) and the membrane has high ion exchange capacity. However, the membrane has low flexibility and when the membrane is used in an electrolysis of alkali metal chloride, a peeling-off phenomenon with blisters is easily caused.

In the production of the copolymer for the fluorinated cation exchange membrane of the invention, the ratio of the components of the fluorovinyl polyether (I), the fluorovinyl compound (II) and the fluorinated olefin (III) is quite important because it relates to the ion exchange capacity which is the important characteristic of the membrane.

It has been found that the total components of the fluorovinyl polyether (I) and the fluorovinyl compound (II) which respectively have an ion exchange group or a functional group which can be converted to an ion exchange group is preferably 1 to 30 mole % especially 5 to 25 mole % based on the copolymer.

The ratio of the fluorovinyl polyether (I) to the fluorinated olefin (III) is important because it relates to the mechanical properties such as flexibility and fabricatability of the cation exchange membrane thereof. The molar ratio of the fluorovinyl polyether (I) to the fluorovinyl compound (II) is preferably 0.1 to 5.0 especially 0.2 to 2.0.

The copolymer having the specific three components is processed to prepare the excellent fluorinated cation exchange membrane having carboxylic acid groups on side chains as ion exchange groups, if necessary, under hydrolyzing the copolymer preferably after the fabrication of the membrane.

The resulting fluorinated cation exchange membrane of the invention has excellent chlorine resistance, oxidation resistance and alkali resistance which are required in the electrolysis because the membrane is made of the fluorinated copolymer. Moreover, the characteristics of the cation exchange membrane in the electrolysis are remarkably superior to those of the conventional ones to obtain an alkali metal hydroxide having high concentration such as higher than 40 wt. % in the current efficiency of higher than 90%. These characteristics can be maintained in stable for a long time because the membrane has excellent durability without any deterioration.

The fluorovinyl polyethers (I) which are one of the components of the copolymer for the fluorinated cation exchange membrane have the formula

CF₂ =
CF—O—CF₂(CFXOCF₂)ₐ—(CFX')ᵦ—(CF₂OCFX")ᵧ—A wherein α, β, γ, X, X', X" and A are defined above. It is preferable to be α = 0 to 2; β = 0 to 5 and γ = 0 to 1. From the viewpoints of availability, it is preferable that X, X' and X" are respectively —F or —CF₃. From the viewpoints of reactivity, it is preferable that A is —COF or —COOR₁. Suitable fluorovinyl polyethers (I) include

CF₂=CFOCF₂CF(CF₃)OCF₂CF₂CF₂COOCH₃,

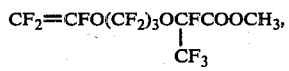

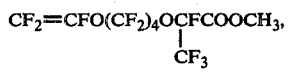

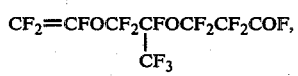

CF₂=CFOCF₂CF(CF₃)OCF(COF)CF₃, etc..

The fluorovinyl compounds (II) have the formula

CF₂ = CF(O)₈(CFY)ᵧA' wherein δ, γ, Y and A' are defined above. It is preferable to be δ = 1, γ = 2 to 4 and Y = —F. From the viewpoint of reactivity, A' is preferably —COF or —COOR₁.

Suitable fluorovinyl compounds (II) include

CF₂ = CF(CF₂)₂₋₄COOCH₃,

CF₂ = CF(CF₂)₂₋₄COF,

CF₂ = CFO(CF₂)₂₋₄COOCH₃,

CF₂ = CFO(CF₂)₂₋₄COOC₂H₅,

CF₂ = CFO(CF₂)₂₋₄COF, etc..

The fluorinated olefins have the formula

CF₂ = CZZ' wherein Z and Z' are defined above.

Suitable fluorinated olefins include tetrafluoroethylene, trifluorochloroethylene, hexafluoropropylene, trifluoroethylene, vinylidenefluoride, etc.. It is preferable to use a perfluoro compound especially tetrafluoroethylene.

The ratio of the components of the fluorovinyl polyether (I), the fluorovinyl compound (II) and the fluorinated olefin (III) in the copolymer are defined above.

It is preferable to give the ion exchange capacity of the resulting cation exchange membrane made of the copolymer 0.5 to 2.0 preferably 0.9 to 1.6 especially 1.0 to 1.4 milli equivalent (meq) per gram of a dry polymer by selecting the ratio of the components of the fluorovinyl compounds (I), (II) and (III) in the above-mentioned ranges.

When the ion exchange capacity is lower than the abovementioned range, the ion exchangeability is low and the electric resistance is high, disadvantageously. On the other hand, when the ion exchange capacity is higher than the above-mentioned range, the water content in the membrane is high and the current efficiency is low disadvantageously.

In the production of the copolymer, it is possible to modify the copolymer by using more than one of each fluorovinyl compound (I), (II) or (III) or the other comonomer.

For example, it is possible to impart high flexibility to the membrane by adding a comonomer having the formula:

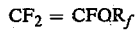
$$CF_2 = CFOR_f$$

wherein $R_f$ represents a $C_{1-10}$ perfluoroalkyl group. It is also possible to crosslink the copolymer by adding a divinyl monomer such as $CF_2 = CF—CF=CF_2$ and $CF_2 = CFO(CF_2)_{1-5}OCF = CF_2$.

The copolymers of the invention can be produced by the conventional methods with or without using an inert organic solvent or an aqueous solvent under the action of a polymerization initiating sources such as a peroxide compound, an azo compound, the ultraviolet radiation or the ionized high energy radiation, etc. (U.S. Pat. No. 3,536,733; OLS No. 2,052,495 (West Germany); U.S. Pat. No. 3,642,742).

The polymerization methods can be various ones such as bulk polymerization, solution polymerization, suspension polymerization and precipitation polymerization.

The fluorinated copolymers used in the invention can be graft copolymers and block copolymers and preferably the copolymer in which the ion exchange groups are uniformly distributed to give uniform ion exchange capacity which is produced by directly copolymerizing the fluorovinyl compounds.

The molecular weight of the copolymer is important because it relates to the mechanical properties such as tensile strength and fabricapability of the membrane.

When the molecular weight of the copolymer is shown by the temperature for specific volumetric melt flow rate, the temperature for volumetric melt flow rate of 100 mm$^3$/second is in a range of 150° to 300° C. especially 160° to 250° C.

When the three specific fluorovinyl compounds (I), (II), (III) are copolymerized, a desired copolymer having high molecular weight can be easily obtained.

In general, in order to improve the mechanical property of a fluorinated copolymer without decreasing ion exchange capacity by copolymerizing a third monomer, the ratio of the monomer having ion exchange group can not be decreased. Accordingly the ratio of the fluorinated olefin which has high reactivity must be decreased to cause lower molecular weight. However, in accordance with the invention, the ratio of the fluorinated olefin is not decreased because the specific combination of monomer (I), (II), (III) is used.

Thus, the fluorinated copolymer having good mechanical property and high ion exchange capacity can be produced in this invention. It is found that the glass transition temperature of the copolymer is preferably at least 20° C., especially at least 30° C., lower than the temperature of the electrolysis. Thus, the glass transition temperature is usually lower than 70° C., especially 50° C.

When the cation exchange membrane made of the copolymer having the low glass transition temperature is used in the electrolysis, high current efficiency can be attained.

The glass transition temperature of the copolymer is dependent upon the types of the fluorovinyl compounds (I), (II), (III), the ratio thereof, the crosslinked degree and the ion exchange capacity. It is possible to give the desired glass transition temperature by selecting these factors.

The methods of forming the cation exchange membrane by using the fluorinated copolymer can be known methods such as a press molding method, a roll molding method, an extrusion molding method, a solution flow-spreading method, a dispersion molding method or a powder molding method. It is necessary to form a non-porous membrane because the membrane should not substantially pass the electrolyte and should selectively pass only specific ions in the electrolysis. From the viewpoint, the water permeability of the membrane is preferably lower than 100 ml/hour/m$^2$ especially lower than 10 ml/hour/m$^2$ under 1 m of water head (at 60° C. in 4N—NaCl having pH 10).

The thickness of the membrane is preferably in a range of 20 to 1000 microns especially 50 to 500 microns.

When the copolymer has functional groups which can be converted to carboxylic acid groups, the functional groups are converted to carboxylic acid groups by suitable treatment before or after the fabrication of the membrane preferably after the fabrication of the membrane by using the copolymer.

For example, when the functional group is —CN, —COF, —COOR$_1$, —COOM or —CONR$_2$R$_3$ wherein M and R$_1$, R$_2$ and R$_3$ are defined above, the functional groups can be converted to carboxylic acid groups by a hydrolysis or a neutralization with an alcoholic solution of acid or base.

In the fabrication of the membrane, it is possible to blend a polymer such as polyethylene, and polypropylene preferably polytetrafluoroethylene and copolymer of ethylene and tetrafluoroethylene to the fluorinated copolymer.

It is also possible to reinforce the membrane by supporting the fluorinated copolymer on a supporter such as fabric e.g. cloth and net nonwoven fabric or porous film made of the polymer shown above. Incidentally, the weight of the polymer used for the blend or the supporter is not considered in the measurement of the ion exchange capacity.

The known diaphragm electrolyzing methods can be applied in producing an alkali hydroxide using the cation exchange membrane by the electrolysis of an alkali chloride. For example, the electrolytic voltage and the current density are preferably 2.3 to 5.5 volts, and 5 to 100 A/dm$^2$, respectively. The anode used in the electrolysis can be an anticorrosive electrode having size stability which is made of graphite or a titanium substrate coated with a platinum group metal or an oxide of a platinum group metal. The electrolyte cell system can be unipolar or multipolar. Thus, in the case of the two compartment cell wherein the anolyte compartment and the catholyte compartment are formed by partitioning the anode and the cathode with the cation exchange membrane, and an aqueous solution of alkali metal chloride is fed into the anolyte compartment to electrolyze it to obtain an alkali metal hydroxide from the catholyte compartment, it is possible to produce sodium hydroxide having a high concentration of greater than 40%, with high current efficiency of higher than 90% by electrolyzing an aqueous solution of sodium chloride having a concentration of higher than 2N at from 40° to 100° C., preferably 50° to 90° C., using a current density of 5 to 50 A/dm$^2$. The process of the invention is not limited to the two compartment cell system, and can be attained by using a three compartment cell wherein an anode compartment, a cathode compartment and a middle compartment are formed by partitioning the anode and the cathode by using a plurality of cation exchange membranes or combinations with other cation exchange membranes or other diaphragms. A cell having more than three compartments can also be used. The fluorinated cation exchange membranes of the invention have excellent characteristics for the electrolysis of an alkali metal chloride and they can be used in various fields such as for diaphragms for electrolytic reduction, fuel cells, electrodialysis or diffusion dialysis especially where the use requires an anticorrosive membrane.

A further understanding can be obtained by reference to certain specific examples which are provided herein for purposes of illustration only and are not intended to be limiting unless otherwise specified. In the examples, the ion-exchange capacity of a cation exchange membrane is measured as follows. An H-type cation exchange membrane is immersed into 1N—HCl at 60° C. for 5 hours to completely convert it to an H-type membrane, and then the membrane is washed with water to be free of HCl. Then, 0.5 g of the H-type membrane is immersed into a solution prepared by adding 25 ml of water to 25 ml of 0.1N—HaOH to completely convert it to a Na+ type membrane. Then the membrane is taken out and the amount of NaOH in the solution is measured by back titration with 0.1N—HCl.

A volumetric melt flow rate is defined as follows: 1 g of a sample of the copolymer is extruded through a nozzle having a diameter of 1 mm and a length of 2 mm under a predetermined pressure of 30 Kg/cm$^2$ at a predetermined temperature. The volumetric melt flow rate is shown by the amount of polymer flowed in the unit of mm$^3$/second. A glass transition temperature of the copolymer was measured by using scanning type differential thermal analyzer (Model DBC-2 manufactured by Perkin-Elmer Co.) as follows:

About 10 mg of a dried film sample (methyl ester type of the copolymer) was sealed at the center on a sample pan and was heated at a rate of 10° C./min..

EXAMPLE 1

In a reactor containing dispersed C$_s$F, methyl (3-fluorocarbonyl) tetrafluoropropionate (bp. 80° to 82° C.) produced by reacting perfluoro-γ-butyrolactone with an equimole of methanol was charged. The reactor was kept at 0° to 10° C. and hexafluoropropyleneoxide was fed into the autoclave at a molar ratio of 2.5 to the methyl ester.

After the reaction, the reaction mixture was distilled to separate the adduct of 2 moles of hexafluoropropyleneoxide having the formula

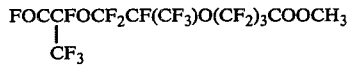

as the fraction having a boiling point of 70° to 75° C./10 mmHg.

In a reactor containing dispersed Na$_2$CO$_3$, the adduct was added dropwise at 140° C. After ceasing the generation of carbon dioxide gas, the compound having the formula

was separated by a distillation as a fraction having a boiling point of 63° to 67° C./30 mmHg. The products were confirmed by the 19F NMR.

In a 200 ml stainless steel autoclave, 40 wt. parts of the resulting CF$_2$ = CFOCF$_2$CF(CF$_2$)O(CF$_2$)$_3$COOCH$_3$ and 60 wt. parts of CF$_2$ = CFO(CF$_2$)$_3$COOCH$_3$ and trichlorotrifluoroethane and azobisisobutyronitrile as a catalyst were charged.

The autoclave was cooled with liquid nitrogen and was purged in vacuum and then the autoclave was heated at 70° C. and tetrafluoroethylene was fed to react them whereby a three component copolymer having 180° C. of the temperature for the volumetric melt flow rate of 100 mm$^3$/second and 10° C. of the glass transition temperature was obtained after the reaction for 18 hours.

The three component copolymer was press-molded at 200° C. and the resulting film having a thickness of 150 microns was hydrolyzed to obtain a cation exchange membrane having an ion exchange capacity of 1.10 meq/g dry polymer.

The water permeability of the membrane was 4.3 ml/hour/m$^2$ under 1 m of water head (60° C. in 4N—NaCl having pH 10).

Two compartment type electrolytic cell was prepared by partitioning an anolyte and a catholyte with the cation exchange membrane and using an anode of titanium coated with rhodium and a cathode made of stainless steel with a space of the electrodes of 2.2 cm and an effective area of 25 cm$^2$.

The electrolysis of sodium chloride was carried out under the following conditions.

The anode compartment was filled with 4N—NaCl aqueous solution and the cathode compartment was filled with 8N—NaOH aqueous solution. The electrolysis was carried out by feeding 4N—NaCl aqueous solution at a rate of 150 cc/hour into an anode compartment, and feeding 0.1N—NaOH aqueous solution under a cell voltage of 4.28 volts, in a current density of 28A/dm$^2$ at 92° C. at pH of the anolyte of 3.

The aqueous solution of sodium chloride was overflowed from the anode compartment and the aqueous solution of sodium hydroxide was overflowed from the cathode compartment. The current efficiency was measured from the amount of NaOH which was produced by the electrolysis.

As the result, 14.4N—NaOH aqueous solution was obtained from the cathode compartment at a current efficiency of 93.3%.

The content of sodium chloride in the resulting sodium hydroxide was less than 0.1%. The characteristic of the membrane was not changed and no abnormal condition on the surface of the membrane was found even after using the membrane for 3 months.

EXAMPLE 2

In accordance with the process of Example 1 except feeding hexafluoropropyleneoxide at a molar ratio of 3.5 to the methyl (3-fluorocarbonyl) tetrafluoropropionate, an adduct of 3 moles of hexafluoropropyleneoxide having the formula

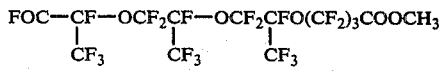

(boiling point of 95° to 98° C./2 mmHg) was obtained.

In a reactor containing dispersed $Na_2CO_3$, the adduct was thermally decomposed and then the compound having the formula $$CF_2=CFOCF_2CF(CF_3)OCF_2CF(CF_3)O(CF_2)_3COOCH_3$$

(boiling point of 67° to 70° C./2 mmHg) was separated. The products were confirmed by the 19F NMR.

In accordance with the process of Example 1, the copolymerization was carried out by feeding tetrafluoroethylene to a mixture of 50 wt. parts of $CF_2=CFOCF_2CF(CF_3)OCF_2CF(CF_3)O(CF_2)_3COOCH_3$ and 50 wt. parts of $CF_2=CFO(CF_2)_3COOCH_3$ to obtain a three component copolymer having 190° C. of the temperature for the volumetric melt flow rate of 100 mm³/second.

The copolymer was press-molded and the resulting film having a thickness of 20 microns was hydrolyzed to obtain a cation exchange membrane having an ion exchange capacity of 0.98 meq/g dry polymer. The water permeability of the membrane was 3.5 ml/hour/m².

In accordance with the process of Example 1 except using the resulting cation exchange membrane, the electrolysis of sodium chloride was carried out, whereby 14.4N—NaOH aqueous solution was obtained from the cathode compartment in a current efficiency of 90.5%.

The content of sodium chloride in the resulting sodium hydroxide was less than 0.1%.

The characteristic of the membrane was not changed and no abnormal condition on the surface of the membrane was found even after using the membrane for 3 months.

REFERENCE 1

In accordance with the process of Example 1 except using a cation exchange membrane which was prepared by hydrolyzing a film of a copolymer of $C_2F_4$ and $CF_2=CFOCF_2CF(CF_3)O(CF_2)_3COOCH_3$ having 145° C. of the temperature for a volumetric melt flow rate of 100 mm³/second and 0° C. of the glass transition temperature which had a thickness of 300 microns and an ion exchange capacity of 0.96 meq/g dry polymer, the electrolysis of sodium chloride was carried out.

As the result, 14.4N—NaOH was obtained from the cathode compartment in a current efficiency of 86.4%.

The characteristic of the membrane was not changed and no abnormal condition on the surface of the membrane was found even after using the membrane for 3 months. However, the tensile strength of the membrane was lower than those of the membranes of Examples 1 and 2.

REFERENCE 2:

In accordance with the process of Example 1 except using a cation exchange membrane which was prepared by hydrolyzing a film of a copolymer of $C_2F_4$ and $CF_2=CFO(CF_2)_3COOCH_3$ having 190° C. of the temperature for the volumetric melt flow rate of 100 mm³/second and 22° C. of the glass transition temperature which had a thickness of 300 microns and an ion exchange capacity of 1.20 meq/g dry polymer, the electrolysis of sodium chloride was carried out.

As the result, 14.4N—NaOH was obtained from the cathode compartment in a current efficiency of 92%. The current efficiency was decreased for about 3% and the peeling-off phenomenon with many blisters in the membrane was found after using the membrane for 3 months.

EXAMPLE 3

In a 200 ml stainless steel autoclave, 40 wt. parts of the compound having the formula $$CF_2=CFOCF_2CF(CF_3)O(CF_2)_3COOCH_3$$

which was produced by the process of Example and 60 wt. parts of $CF_2=CFCF_2COOCH_3$ and trichlorotrifluoroethane and azobisisobutyronitrile were charged.

The autoclave was cooled with liquid nitrogen and was purged in vacuum. The autoclave was heated at 70° C. and tetrafluoroethylene was fed into the autoclave to react them whereby a three component copolymer having 180° C. of the temperature for the volumetric melt flow rate of 100 mm³/second and 15° C. of the glass transition temperature was obtained after 18 hours.

The three component copolymer was press-molded at 200° C. to form a film having a thickness of 150 microns and the film was hydrolyzed to obtain a cation exchange membrane having an ion exchange capacity of 1.23 meq/g dry polymer.

The water permeability of the membrane was 4.6 ml/hour/m² under 1 m of water head (at 60° C. in 4N—NaCl having pH 10).

In accordance with the process of Example 1 except using the resulting cation exchange membrane, the electrolysis of sodium chloride was carried out, whereby 14.4N—NaOH aqueous solution was obtained from the cathode compartment in a current efficiency of 91.0%.

The content of sodium chloride in the resulting sodium hydroxide was less than 0.1%.

The characteristic of the membrane was not changed and no abnormal condition on the surface of the membrane was found even after using the membrane for 3 months.

EXAMPLE 4

In accordance with the process of Example 1, the copolymerization was carried out by feeding tetrafluoroethylene to a mixture of 50 wt. parts of $$CF_2=CFOCF_2CF(CF_3)OCF_2CF(CF_3)O(CF_2)_3COOCH_3$$

and 50 wt. parts of $CF_2=CF(CF_2)_3COOCH_3$, to obtain a three component copolymer having 190° C. of the temperature for the volumetric melt flow rate of 100 mm³/second.

The copolymer was press-molded and the resulting film having a thickness of 250 microns was hydrolyzed to obtain a cation exchange membrane having an ion exchange capacity of 1.12 meq/g dry polymer and a glass transition temperature of 150° C. The water permeability of the membrane was 4.0 ml/hour/m².

In accordance with the process of Example 1 except using the resulting cation exchange membrane, the electrolysis of sodium chloride was carried out, whereby 14.4N–NaOH aqueous solution was obtained from the cathode compartment in a current efficiency of 90.1%.

The content of sodium chloride in the resulting sodium hydroxide was less than 0.1%.

The characteristic of the membrane was not changed and no abnormal condition on the surface of the membrane was found even after using the membrane for 3 months.

REFERENCE 3

In accordance with the process of Example 1 except using a cation exchange membrane which was prepared by hydrolyzing a film of a copolymer of $C_2F_4$ and $CF_2 = CF(CF_2)_1COOCH_3$ having 190° C. of the temperature for the volumetric melt flow rate of 100 mm$^3$/second and 35° C. of the glass transition temperature which had a thickness of 300 microns and an ion exchange capacity of 1.15 meq/g dry polymer, the electrolysis of sodium chloride was carried out.

As the result, 14.4N—NaOH was obtained from the cathode compartment in a current efficiency of 90.0%.

The current efficiency was decreased for about 3% and the peeling-off phenomenon with many bubbles in the membrane was found after using the membrane for 3 months.

What is claimed is:

1. A fluorinated cation exchange membrane which is made of a three component copolymer produced by copolymerizing a fluorovinylpolyether having the formula I $$CF_2=CF-O-CF_2-(CFXOCF_2)_\alpha-(CFX')_\beta-(CF_2OCFX'')_\gamma-A$$

wherein $\alpha$ is 0 to 3; $\beta$ is 0 to 6; $\gamma$ is 0 to 4 and either $\alpha$ or $\gamma$ is not 0; X, X' and X'' respectively represent —F or a $C_{1-5}$ perfluoroalkyl group; A represents —CN—, —COF, —COOH, —COOR$_1$, —COOM or —CONR$_2$R$_3$; R$_1$ represents a $C_{1-10}$ alkyl group preferably a $C_{1-3}$ alkyl group; R$_2$ and R$_3$ respectively represents hydrogen atom or a $C_{1-10}$ alkyl group; and M represents an alkali metal atom or a quaternary ammonium group, a fluorovinyl compound having the formula II $$CF_2=CF-(O)_\delta-(CFY)_\gamma-A'$$

wherein $\delta$ is 0 to 1; $\gamma$ is 1 to 6; Y represents —F or a $C_{1-5}$ perfluoroalkyl group; A' repesents —CN—, —COF, —COOH, —COOR$_1$, —COOM or —CONR$_2$R$_3$; and a fluorinated olefin having the formula III $$CF_2=CZZ'$$

wherein Z and Z' respectively represent —H, —Cl, —F or —CF$_3$, and if necessary hydrolyzing the copolymer wherein said copolymer comprises 1 to 30 mole % fluorovinylpolyether (I) and fluorovinyl compound (II) and wherein the molar ratio of fluorovinylpolyether (I) to fluorovinyl compound (II) is from 0.1 to 5.0.

2. A fluorinated cation exchange membrane according to claim 1, wherein the copolymer comprises 5 to 25 mole % of a total of the components of the fluorovinylpolyether (I) and the fluorovinyl compound (II) at 0.2 to 2.0 of a molar ratio of the fluorovinylpolyether (I) to the fluorovinyl compound (II).

3. A fluorinated cation exchange membrane according to claim 1 wherein an ion exchange capacity of the membrane is in a range of 0.9 to 2.0 meq/g dry polymer.

4. A fluorinated cation exchange membrane according to claim 1, wherein a temperature for the volumetric melt flow rate of 100 mm$^3$/second of the copolymer is in a range of 150° to 300° C.

5. A fluorinated cation exchange membrane according to claim 1, wherein a glass transition temperature of the copolymer is lower than 70° C.

6. A fluorinated cation exchange membrane according to claim 1, wherein a water permeability of the copolymer under 1 m of water head at 60° C. in 4N-NaCl having pH of 10 is less than 10 ml/hour/m$^2$.

7. A fluorinated cation exchange membrane according to claim 1, wherein a thickness of the membrane is in a range of 20 to 1000 microns.

8. A fluorinated cation exchange membrane according to claim 1, wherein the fluorovinylpolyether (I) is $$CF_2=CFOCF_2CF(CF_3)O(CF_2)_3COOCH_3 \text{ or}$$
$$CF_2=CFO(CF_2)_3OCF(CF_3)COOCH_3.$$

9. A fluorinated cation exchange membrane according to claim 1, wherein the fluorovinyl compound (II) is $$CF_2=CFO(CF_2)_{2-4}COOCH_3 \text{ or}$$
$$CF_2=CFO(CF_2)_{2-4}COF.$$

10. A fluorinated cation exchange membrane according to claim 1, wherein the fluorovinyl compound (II) is $$CF_2=CF(CF_2)_{0-4}COOCH_3 \text{ or } CF_2=CF(CF_2)_{0-4}COF.$$

11. A fluorinated cation exchange membrane according to claim 1, wherein the fluorinated olefin (III) is tetrafluoroethylene or trifluorochloroethylene.

12. A fluorinated cation exchange membrane according to claim 1, wherein the copolymer is produced by hydrolyzing a copolymer which comprises components of $$CF_2=CFOCF_2CF(CF_3)O(CF_2)_3COOCH_3 \text{ (I)},$$
$$CF_2=CFO(CF_2)_3COOCH_3 \text{ (II) and}$$
$$CF_2=CF_2 \text{ (III)}.$$

13. A fluorinated cation exchange membrane according to claim 1, wherein the copolymer is produced by hydrolyzing a copolymer which comprises components of $$CF_2=CFOCF_2CF(CF_3)O(CF_2)_3COOCH_3 \text{ (I)},$$
$$CF_2=CFCF_2COOCH_3 \text{ (II) and}$$
$$CF_2=CF_2 \text{ (III)}.$$

* * * * *